(12) United States Patent
Kumagai et al.

(10) Patent No.: US 11,379,974 B2
(45) Date of Patent: Jul. 5, 2022

(54) ELECTROPHORETIC SEPARATION DATE ANALYZING APPARATUS, ELECTROPHORETIC SEPARATION DATA ANALYZING METHOD, AND COMPUTER PROGRAM FOR CAUSING A COMPUTER TO EXECUTE THE ANALYZING METHOD

(71) Applicant: SHIMADZU CORPORATION, Kyoto (JP)

(72) Inventors: Hidesato Kumagai, Kyoto (JP); Akira Harada, Kyoto (JP); Kota Ogino, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/504,422

(22) Filed: Jul. 8, 2019

(65) Prior Publication Data
US 2020/0043162 A1    Feb. 6, 2020

(30) Foreign Application Priority Data
Aug. 3, 2018    (JP) .............................. JP2018-146355

(51) Int. Cl.
*G06K 9/00*    (2022.01)
*G06T 7/00*    (2017.01)
*G01N 27/447*    (2006.01)

(52) U.S. Cl.
CPC ..... *G06T 7/0012* (2013.01); *G01N 27/44704* (2013.01); *G01N 27/44756* (2013.01); *G06K 9/00496* (2013.01)

(58) Field of Classification Search
CPC .................................................. G01N 27/447
See application file for complete search history.

(56) References Cited

U.S. PATENT DOCUMENTS 4,592,089 A    5/1986   Hartman
5,121,320 A    6/1992   Aoki et al.
(Continued)

FOREIGN PATENT DOCUMENTS

JP    57-94849 U    6/1982
JP    2-107962 A    4/1990
(Continued)

OTHER PUBLICATIONS

Extended European Search Report dated Dec. 6, 2019 issued by the European Patent Office in counterpart application No. 19181838.4.
(Continued)

*Primary Examiner* — Hadi Akhavannik
(74) *Attorney, Agent, or Firm* — Sughrue Mion, PLLC

(57) ABSTRACT

An electrophoretic separation data analyzing apparatus includes an analysis target peak identifying part configured to require a user to input analysis target peak information on analysis target peaks to be added to an analysis target in separation data obtained by electrophoretic separation, and to identify at least one of the analysis target peaks based on the analysis target peak information, a peak-of-interest identifying part configured to require the user to input peak-of-interest information on a peak of interest among the analysis target peaks, and identify the peak of interest based on the peak-of-interest information, and an abundance ratio calculating part configured to determine an abundance ratio of the peak of interest among all of the analysis target peaks based on a total value of peak areas of the analysis target peaks and a peak area value of the peak of interest.

13 Claims, 6 Drawing Sheets

(56) References Cited

U.S. PATENT DOCUMENTS

| | | | | |
|---|---|---|---|---|
| 8,399,827 B1* | 3/2013 | Grothe | ................ | H01J 49/0036 |
| | | | | 250/282 |
| 2008/0319678 A1* | 12/2008 | Templeton | ....... | G01N 33/57415 |
| | | | | 702/19 |
| 2010/0304381 A1* | 12/2010 | Taing | .................... | C07H 19/10 |
| | | | | 435/6.12 |
| 2011/0042213 A1* | 2/2011 | Updyke | ........... | G01N 27/44721 |
| | | | | 204/461 |
| 2012/0043208 A1* | 2/2012 | Jin | ................... | G01N 27/44769 |
| | | | | 204/452 |
| 2012/0303288 A1* | 11/2012 | Morinaga | .............. | G16B 40/00 |
| | | | | 702/23 |
| 2013/0334049 A1* | 12/2013 | Wei | ................. | G01N 27/44721 |
| | | | | 204/603 |
| 2016/0333397 A1* | 11/2016 | Matsunaga | .......... | C12Q 1/6816 |

FOREIGN PATENT DOCUMENTS

| | | | |
|---|---|---|---|
| JP | 2000-163591 A | 6/2000 | |
| JP | 2005-069846 A | 3/2005 | |
| WO | 2015/011209 A1 | 1/2015 | |

OTHER PUBLICATIONS

Communication dated Dec. 20, 2021 from the Chinese Patent Office in Chinese Application No. 201910659595.4.
Communication dated Feb. 1, 2022 from the Japanese Patent Office in Japanese Application No. 2018-146355.

* cited by examiner

US 11,379,974 B2

ELECTROPHORETIC SEPARATION DATE ANALYZING APPARATUS, ELECTROPHORETIC SEPARATION DATA ANALYZING METHOD, AND COMPUTER PROGRAM FOR CAUSING A COMPUTER TO EXECUTE THE ANALYZING METHOD

BACKGROUND OF THE INVENTION

1. Field of the Invention

The present invention relates to an electrophoretic separation data analyzing apparatus for analyzing separation data obtained by electrophoresis separation, an electrophoretic separation data analyzing method, and a computer program for causing a computer to execute the analyzing method.

2. Description of the Related Art

In the field of biochemistry, based on separation data obtained by electrophoretic separation, an abundance ratio of a molecule (nucleic acid or protein) of interest among similar molecules mixed in a sample may be determined and used for analysis of the sample (see JP 2005-69846 A). Examples include a case where abundance ratios of wild type gene cells and mutant type gene cells in a cell population are determined, the a where an expression amount of a gene of interest is compared and evaluated with an expression amount of a control gene in expression analysis, and the like.

SUMMARY OF THE INVENTION

Conventionally, as a method for determining an abundance ratio of a molecule of interest, there is a method that obtains a digital image of a gel after a sample is separated by agarose gel electrophoresis or polyacrylamide gel electrophoresis, determines concentration of each fraction from intensity of each fraction in the digital image, and calculates the abundance ratio of the molecule of interest from the concentration of each fraction determined. Further, in an electrophoresis analyzing apparatus using a capillary tube or a microchannel device in recent years, the concentration of each fraction separated by electrophoresis is automatically calculated from an area of each peak appearing in an electropherogram. Thus, it is also possible to determine an abundance ratio of a peak (fraction) of interest by manual calculation or a calculation tool by using the calculated concentration of each fraction.

In any of the above-described methods, it is necessary to determine the abundance ratio of the fraction of interest by manual calculation or calculation using a calculation tool, and data on the abundance ratio cannot be obtained easily and quickly.

Therefore, it is an object of the present invention to make it possible to easily and quickly obtain an abundance ratio of an arbitrary fraction of interest among fractions separated by electrophoresis.

An electrophoretic separation data analyzing apparatus according to the present invention includes an analysis target peak identifying part configured to require a user to input analysis target peak information on analysis target peaks to be added to an analysis target in separation data obtained by electrophoretic separation, and to identify at least one of the analysis target peaks based on the analysis target peak information, a peak-of-interest identifying part configured to require the user to input peak-of-interest information on a peak of interest among the analysis target peaks, and identify the peak of interest based on the peak-of-interest information, and an abundance ratio calculating part configured to determine an abundance ratio of the peak of interest among all of the analysis target peaks based on a total value of peak areas of the analysis target peaks and a peak area value of the peak of interest. Here, "peak" corresponds to each fraction separated by electrophoresis.

That is, the electrophoretic separation data analyzing apparatus according to the present invention is configured in such a way that, by the user simply inputting the analysis target peak information on the analysis target peak and the peak-of-interest information on the peak of interest, the abundance ratio of the peak of interest among the analysis target peaks is automatically determined.

Preferably, in the electrophoretic separation data analyzing apparatus according to the present invention, the abundance ratio calculating part is configured to immediately calculate the abundance ratio of the peak of interest when the analysis target peak and the peak of interest are identified. In this manner, by the user simply inputting the analysis target peak information on the analysis target peak and the peak-of-interest information on the peak of interest, the abundance ratio of the peak of interest can be immediately determined. Thus, the user can quickly obtain the abundance ratio of the peak of interest.

The electrophoretic separation data analyzing apparatus according to the present invention preferably includes an abundance ratio display part that displays the abundance ratio of the peak of interest calculated by the abundance ratio calculating part on a display device. Thus, a user can easily recognize the abundance ratio of the peak of interest.

In the electrophoretic separation data analyzing apparatus according to the present invention, the analysis target peak information that the analysis target peak identifying part requires the user to input may be an analysis target range including a peak to be added to the analysis target, and an analysis exclusion range including a peak to be excluded from the analysis target in the analysis target range. In that case, the analysis target peak identifying part can be configured to identify the peak in the analysis target range excluding the peak in the analysis exclusion range as the analysis target peak. Furthermore, the peak-of-interest information that the peak-of-interest identifying part requires the user to input may be a range of interest including a peak of interest. In that case, the peak-of-interest identifying part can be configured to identify the peak in the range of interest as the peak of interest.

The electrophoretic separation data analyzing apparatus according to the present invention may include an electropherogram creating part that creates an electropherogram as the separation data. In that case, the analysis target peak identifying part can be configured to require the user to specify the analysis target range and the analysis exclusion range on the electropherogram, and the peak-of-interest identifying part can be configured to require the user to specify the range of interest on the electropherogram.

The electrophoretic separation data analyzing apparatus according to the present invention may include a separation image creating part that creates a separation image of a peak on an electrophoresis flow channel as the separation data. In that case, the analysis target peak identifying part can be configured to require the user to specify the analysis target range and the analysis exclusion range on the separation image, and the peak-of-interest identifying part may be configured to require the user to specify the range of interest on the separation image.

The electrophoretic separation data analyzing method according to the present invention includes an analysis target peak identifying step of requiring the user to input analysis target peak information on analysis target peaks to be added to an analysis target in the separation data, and identifying at least one of the analysis target peaks based on the analysis target peak information, a peak-of-interest identifying step of requiring the user to input peak-of-interest information on a peak of interest among the analysis target peaks, and identifying the peak of interest based on the peak-of-interest information, and an abundance ratio calculating step of automatically determining an abundance ratio of the peak of interest among all of the analysis target peaks based on a total value of peak areas of the analysis target peaks and a peak area value of the peak of interest.

In the electrophoretic separation data analyzing method according to the present invention, the abundance ratio calculating step can be executed immediately after the analysis target peak and the peak of interest are identified.

The electrophoretic separation data analyzing method according to the present invention can include an abundance ratio displaying step of displaying the abundance ratio of the peak of interest calculated in the abundance ratio calculating step on a display device.

The analysis target peak information input in the analysis target peak identifying step by the user can be an analysis target range including a peak to be added to the analysis target, and an analysis exclusion range including a peak to be excluded from the analysis target in the analysis target range, and the peak-of-interest information input in the peak-of-interest identifying step by the user can be a range of interest including a peak of interest. In this case, in the analysis target peak identifying step, the peak in the analysis target range excluding the peak in the analysis exclusion range can be identified as the analysis target peak, and in the peak-of-interest identifying step, the peak in the range of interest can be identified as the peak of interest.

The electrophoretic separation data analyzing method according to the present invention can include an electropherogram creating step of creating an electropherogram as the separation data. In that case, in the analysis target peak identifying step, the user can be required to specify the analysis target range and the analysis exclusion range on the electropherogram, and in the peak-of-interest identifying step, the user can be required to specify the range of interest on the electropherogram.

The electrophoretic separation data analyzing method according to the present invention can also include a separation image creating step of creating a separation image of a peak on an electrophoresis flow channel as the separation data. In that case, in the analysis target peak identifying step, the user can be required to specify the analysis target range and the analysis exclusion range on the separation image, and in the peak-of-interest identifying step, the user can be required to specify the range of interest on the separation image.

A computer program according to the present invention is configured to execute the above-described electrophoretic separation data analyzing method by being executed on a computer.

The electrophoretic separation data analyzing apparatus according to the present invention is configured in such a way that, by a user simply inputting analysis target peak information on an analysis target peak and peak-of-interest information on a peak of interest, an abundance ratio of the peak of interest among peaks as analysis targets is automatically determined. Thus, the user can easily and quickly obtain the abundance ratio of the peak of interest.

In the electrophoretic separation data analyzing method according to the present invention, by a user simply inputting analysis target peak information on an analysis target peak and peak-of-interest information on a peak of interest, an abundance ratio of the peak of interest among all analysis target peaks is automatically determined. Thus, the user can easily and quickly obtain the abundance ratio of the peak of interest.

Since the computer program according to the present invention is configured to execute the above-described electrophoretic separation data analyzing method, a computer can be used as an electrophoretic separation data analyzing apparatus according to the present invention simply by installing the computer program in the computer.

DETAILED DESCRIPTION OF THE INVENTION

Hereinafter, one embodiment of an electrophoretic separation data analyzing method and an electrophoretic separation data analyzing apparatus for carrying out the analyzing method will be described with reference to the drawings.

Figure 1:
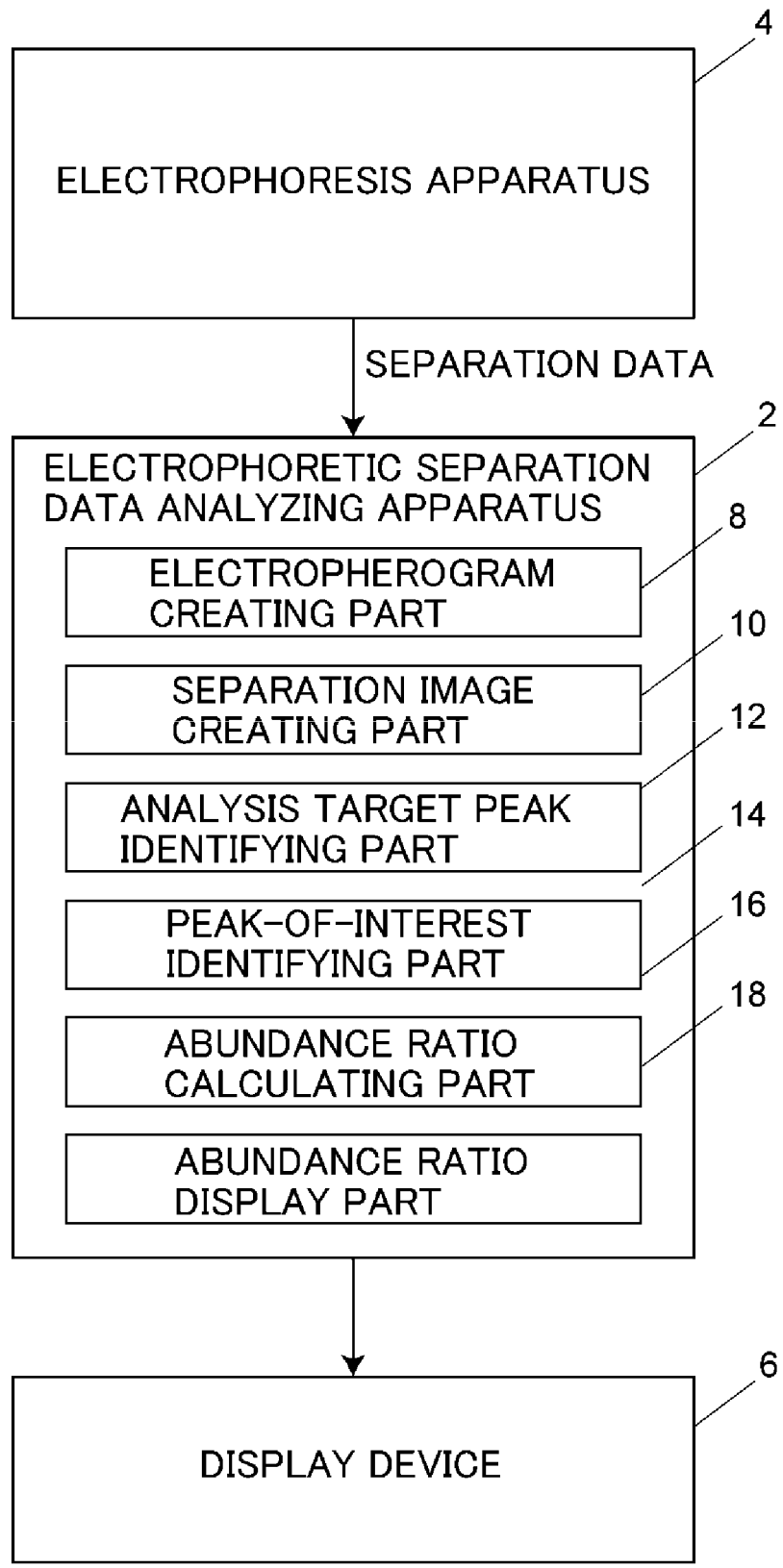
FIG. 1 is a block diagram schematically illustrating an embodiment of an electrophoretic separation data analyzing apparatus.

As illustrated in FIG. 1, an electrophoretic separation data analyzing apparatus 2 (hereinafter, analyzing apparatus 2) carries out data analysis processing by using separation data of a sample obtained by an electrophoresis apparatus 4 carrying out separation of a sample by electrophoresis, and displays an analysis result on a display device 6.

The analyzing apparatus 2 includes an electropherogram creating part 8, a separation image creating part 10, an analysis target peak identifying part 12, a peak-of-interest identifying part 14, an abundance ratio calculating part 16, and an abundance ratio display part 18. The electropherogram creating part 8, the separation image creating part 10, the analysis target peak identifying part 12, the peak-of-interest identifying part 14, the abundance ratio calculating part 16, and the abundance ratio display part 18 are functions obtained by arithmetic elements executing a predetermined program in the analyzing apparatus 2. That is, the analyzing apparatus 2 is implemented by a computer in which a computer program is installed for implementing the functions of the electropherogram creating part 8, the separation image creating part 10, the analysis target peak identifying part 12, the peak-of-interest identifying part 14, the abundance ratio calculating part 16, and the abundance ratio display part 18. The display device 6 is implemented by a liquid crystal display or the like electrically connected to the analyzing apparatus 2.

Figure 2:
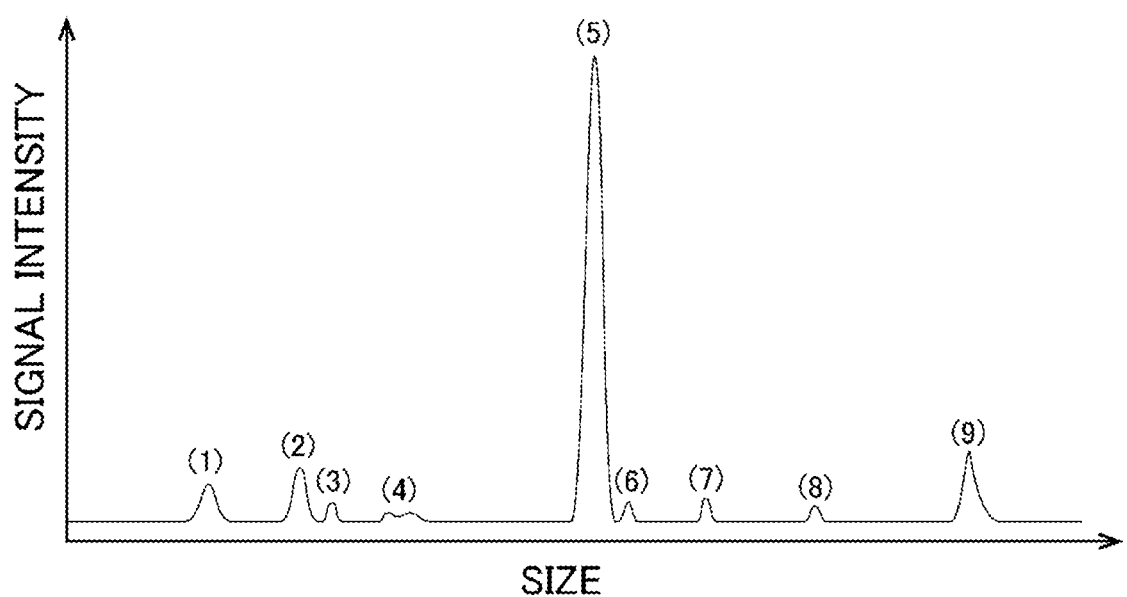
FIG. 2 is an example of an electropherogram created in the same embodiment.

The electropherogram creating part 8 is configured to create an electropherogram based on separation data from the electrophoresis apparatus 4. When the sample is DNA and the electrophoresis apparatus 4 performs gel electrophoresis, as illustrated in FIG. 2, an electropherogram is created in which the abscissa represents the size of a DNA fragment or the molecular weight of protein, and the ordinate represents signal intensity. In the electropherogram of FIG. 2, each fraction separated by electrophoresis appears as peaks (1) to (9). The concentration of each fraction can be determined from the area of peaks (1) to (9).

Figure 3:
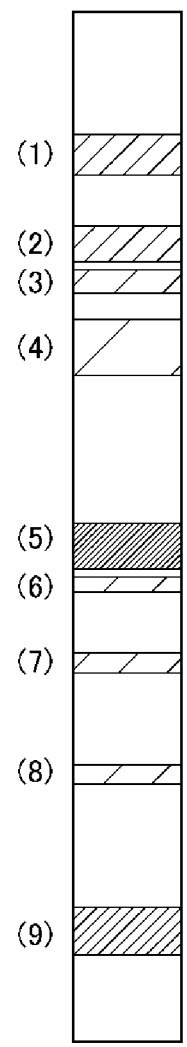
FIG. 3 is an example of a separation image created in the same embodiment.

The separation image creating part 10 is configured to create an image (separation image) of fractions separated on an electrophoresis flow channel of the electrophoresis apparatus 4 as illustrated in FIG. 3 based on the separation data from the electrophoresis apparatus 4. The separation image of FIG. 3 corresponds to the electropherogram of FIG. 2.

The electropherogram created by the electropherogram creating part 8 and the separation image created by the separation image creating part 10 are displayed on the display device 6.

Figure 4:
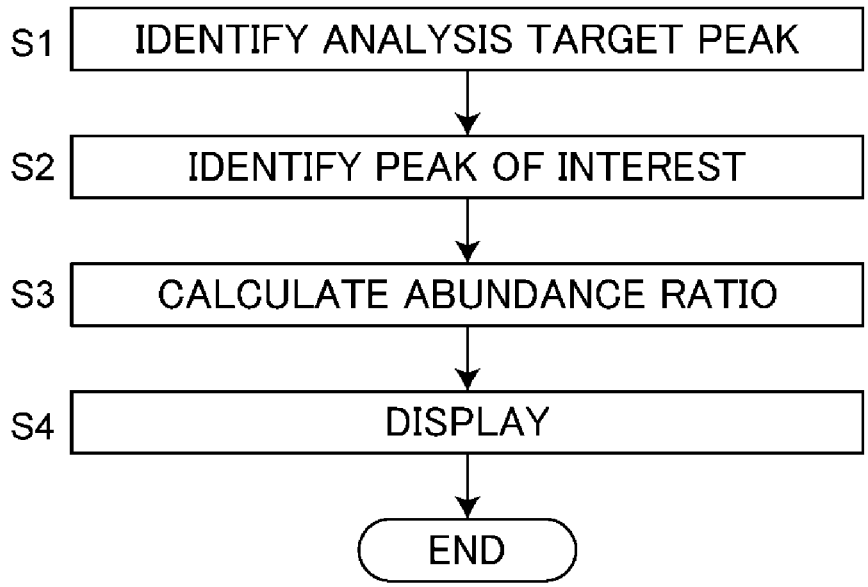
FIG. 4 is a flowchart illustrating operation of the embodiment.

The analysis target peak identifying part 12, the peak-of-interest identifying part 14, the abundance ratio calculating part 16, and the abundance ratio display part 18 are functions to cause the analyzing apparatus 2 to carry out a separation data analyzing method including, as illustrated in a flowchart of FIG. 4, step S1 of identifying an analysis target peak, step S2 of identifying a peak of interest, step S3 of calculating an abundance ratio of the peak of interest, and step S4 of displaying the calculated abundance ratio immediately. Note that although in FIG. 4 the identifying of the peak of interest is performed after the identifying of the analysis target peak, the identifying of the peak of interest may be performed before the identifying of the analysis target peak.

The analysis target peak identifying part 12 is configured to require a user to input analysis target peak information on an analysis target peak desired to be a target of calculation of the abundance ratio, and to identify the analysis target peak based on the analysis target peak information.

Figure 5:
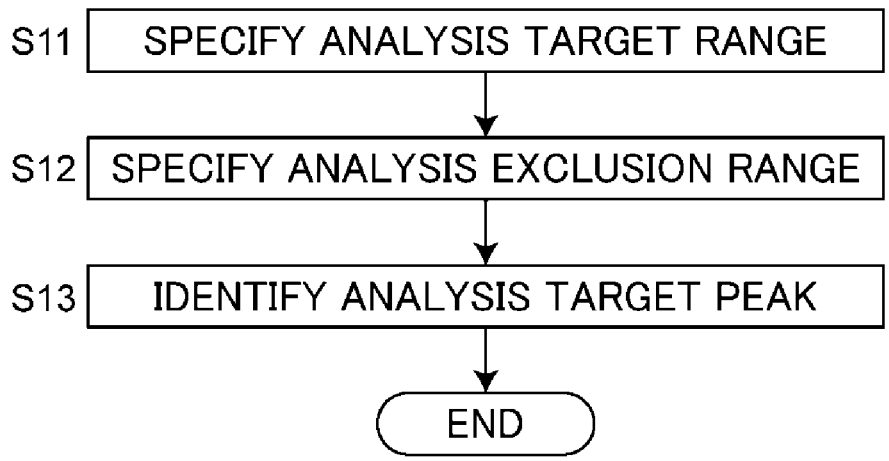
FIG. 5 is a flow chart illustrating an example of operation of identifying an analysis target peak.

The analysis target peak information to be input by the user includes an analysis target range desired to be added to calculation of the abundance ratio, and an analysis exclusion range desired to be excluded from targets of calculation of the abundance ratio. In that case, as illustrated in FIG. 5, the analysis target peak identifying part 12 requires the user to input the analysis target range and the analysis exclusion range (steps S11 and S12), and a peak in the analysis target range excluding a peak in the analysis exclusion range is identified as the analysis target peak. The analysis target range and the analysis exclusion range are ranges of a size of nucleic acid and a molecular weight of protein, which are separated by electrophoresis. In addition, the analysis target peak identifying part 12 may be configured to require the user to input an analysis target peak itself desired to be added to calculation of abundance ratio as the analysis target peak information.

The peak-of-interest identifying part 14 is configured to cause the user to input peak-of-interest information on a peak for which the abundance ratio is desired to be calculated, and identify a peak of interest based on the peak-of-interest information.

Figure 6:
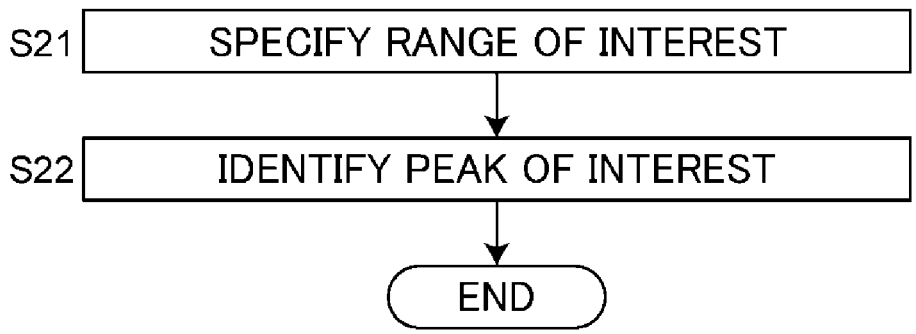
FIG. 6 is a flowchart illustrating an example of operation of identifying a peak of interest.

As the peak-of-interest information to be input by the user, a range of interest including a peak for which the abundance ratio is desired to be calculated can be mentioned. In this case, as illustrated in FIG. 6, the peak-of-interest identifying part 14 requires the user to input a range of interest (step S21), and identifies a peak in the range of interest as a peak of interest (step S22). In addition, the peak-of-interest identifying part 14 may be configured to require the user to input a peak itself for which the abundance ratio is desired to be calculated as the peak-of-interest information.

Figure 7:
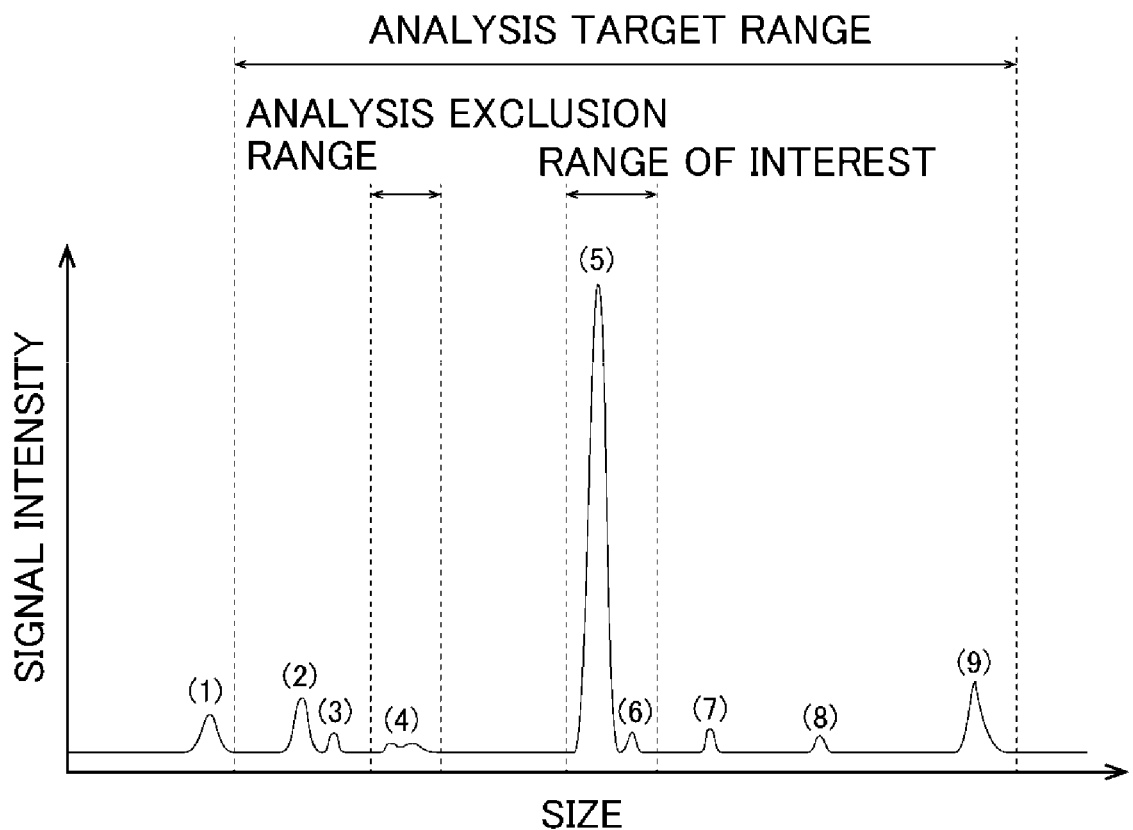
FIG. 7 is a diagram for describing a method of specifying an analysis target range, an analysis exclusion range, and a range of interest on an electropherogram.

As illustrated in FIG. 7, the analysis target peak identifying part 12 and the peak-of-interest identifying part 14 can cause the user to specify each of the analysis target range, the analysis exclusion range, and the range of interest on the electropherogram.

Figure 8:
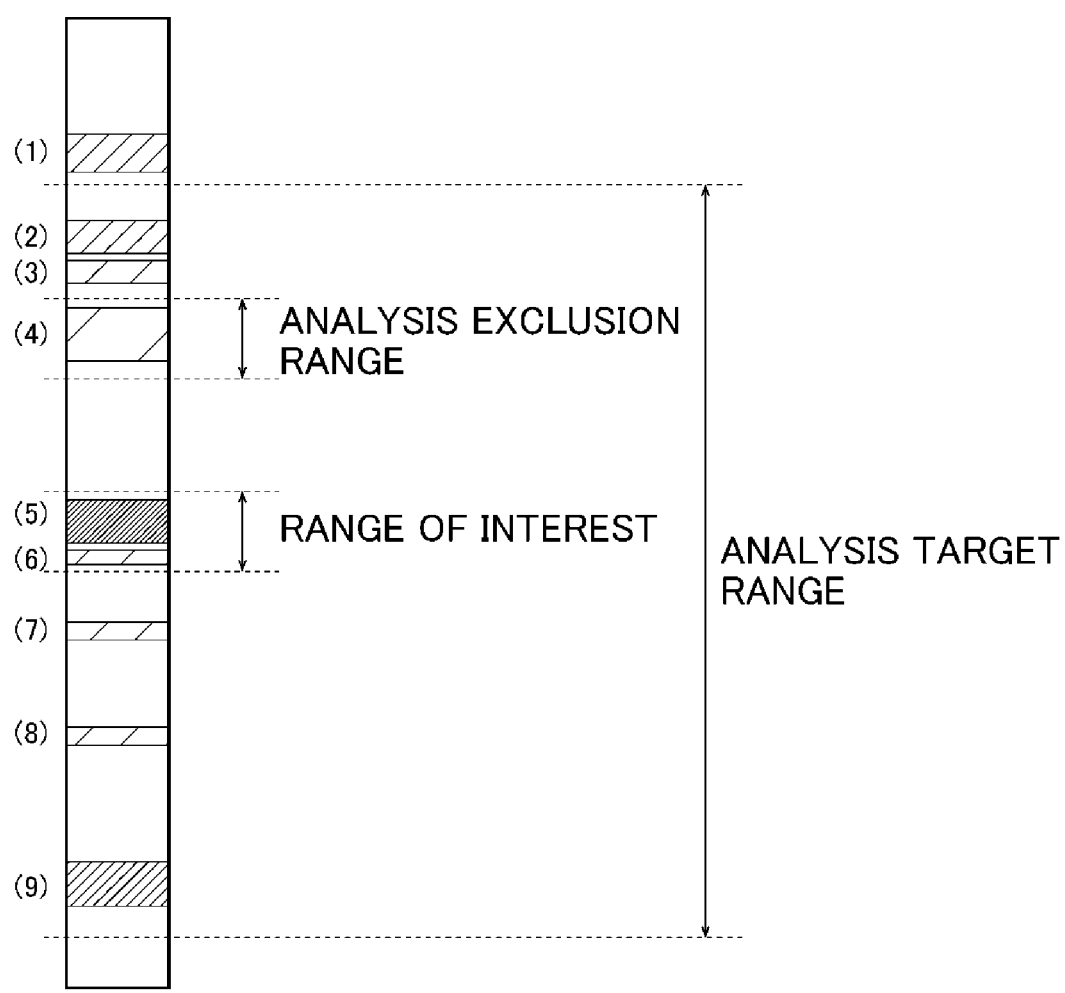
FIG. 8 is a diagram for describing a method of specifying an analysis target range, an analysis exclusion range, and a range of interest on a separation image.

In addition, as illustrated in FIG. 8, the analysis target peak identifying part 12 and the peak-of-interest identifying part 14 can require the user to specify each of the analysis target range, the analysis exclusion range, and the range of interest on the separation image.

In addition, although one analysis exclusion range is specified in FIGS. 7 and 8, two or more analysis target ranges can be specified.

Further, the analysis target peak identifying part 12 and the peak-of-interest identifying part 14 can also require the user to specify each of the analysis target range, the analysis exclusion range, and the range of interest by a numerical value.

In FIGS. 7 and 8, peaks of (2) to (9) are included in the analysis target range, a peak of (4) in the analysis exclusion range, and peaks of (5) and (6) in the range of interest, the ranges being specified by the user. Therefore, the analysis target peak identifying part 12 excludes the peak of (4) in the analysis exclusion range from the peaks of (2) to (9) included in the analysis target range, and identifies the peaks of (2), (3), and (5) to (9) as analysis target peaks. The peak-of-interest identifying part 14 identifies the peaks of (5) and (6) in the range of interest as a peak of interest.

Returning to FIG. 1, when the analysis target peak identifying part 12 and the peak-of-interest identifying part 14 identify the analysis target peaks and the peak of interest, the abundance ratio calculating part 16 is configured to determine the abundance ratio of the peak of interest among the analysis target peaks. The timing of calculation of the abundance ratio of the peak of interest is not particularly limited, but it is preferable that the abundance ratio be calculated immediately after the analysis target peaks and the peak of interest are identified.

The abundance ratio of the peak of interest can be determined by the following equation.

$$\text{Abundance ratio of peak of interest} = \text{Total value of concentration of fraction of peak of interest} / \text{concentration of fraction of analysis target peak} \times 100$$

To explain with the example of FIGS. 7 and 8, the abundance ratio of the peaks of interest (5) and (6) can be determined by dividing the total concentration of the peaks of interest (5) and (6) by the total concentration of the analysis target peaks (2), (3), and (5) to (9), and multiplying the result by 100. The "concentration" may be either "molar concentration" or "mass concentration".

Further, other than the abundance ratio of the peak of interest, the abundance ratio calculating part 16 may be configured to determine an individual abundance ratio of each analysis target peak and a total abundance ratio of analysis target peaks other than the peak of interest by calculation.

The abundance ratio display part 18 is configured to display the abundance ratio of the peak of interest calculated by the abundance ratio calculating part 16 on the display device 6. Thus, the abundance ratio of a peak of interest is automatically calculated and displayed on the display device 6 by the user simply specifying a range of analysis target, a range to be excluded from the analysis target, and a range of interest (or a peak of interest), and thus, the user can easily and quickly obtain the abundance ratio of a fraction of interest.

Furthermore, when the abundance ratio calculating part 16 is configured to calculate the abundance ratio immediately after the analysis target peaks and the peak of interest are identified, the abundance ratio of the peak of interest is displayed on the display device 6 immediately, and thus, the user can recognize the abundance ratio of the fraction of interest in real time.

What is claimed is:

1. An electrophoretic separation data analyzing apparatus for analyzing separation data obtained based on an electropherogram obtained by electrophoretic separation, the analyzing apparatus comprising:
    an analysis target peak identifying part configured to require a user to input analysis target peak information on analysis target peaks from the electropherogram to be added to an analysis target in the separation data, and to identify at least one of the analysis target peaks based on the analysis target peak information;
    a peak-of-interest identifying part configured to require the user to input peak-of-interest information on a peak of interest among the analysis target peaks from the electropherogram, and identify the peak of interest based on the peak-of-interest information; and
    an abundance ratio calculating part configured to determine an abundance ratio of the peak of interest among all of the analysis target peaks based on a total value of peak areas of the analysis target peaks and a peak area value of the peak of interest, wherein
    the analysis target peak information that the analysis target peak identifying part requires the user to input is an analysis target range including a peak to be added to the analysis target, and an analysis exclusion range including a peak to be excluded from the analysis target in the analysis target range,
    the analysis target peak identifying part is configured to identify the peak in the analysis target range excluding the peak in the analysis exclusion range as the analysis target peak.

2. The electrophoretic separation data analyzing apparatus according to claim 1, wherein
    the abundance ratio calculating part is configured to immediately calculate the abundance ratio of the peak of interest if the analysis target peak and the peak of interest are identified.

3. The electrophoretic separation data analyzing apparatus according to claim 1, further comprising an abundance ratio display part configured to display the abundance ratio of the peak of interest calculated by the abundance ratio calculating part on a display device.

4. The electrophoretic separation data analyzing apparatus according to claim 1, wherein
    the peak-of-interest information that the peak-of-interest identifying part requires the user to input is a range of interest including a peak of interest, and
    the peak-of-interest identifying part is configured to identify the peak in the range of interest as the peak of interest.

5. The electrophoretic separation data analyzing apparatus according to claim 4, further comprising an electropherogram creating part that creates an electropherogram as the separation data, wherein
    the analysis target peak identifying part is configured to require the user to specify the analysis target range and the analysis exclusion range on the electropherogram, and
    the peak-of-interest identifying part is configured to require the user to specify the range of interest on the electropherogram.

6. The electrophoretic separation data analyzing apparatus according to claim 4, further comprising a separation image creating part that creates a separation image of a peak on an electrophoresis flow channel as the separation data, wherein
    the analysis target peak identifying part is configured to require the user to specify the analysis target range and the analysis exclusion range on the separation image.

7. An electrophoretic separation data analyzing method for analyzing separation data obtained based on an electropherogram obtained by electrophoresis separation, the analyzing method comprising:
    an analysis target peak identifying step of requiring a user to input analysis target peak information on analysis target peaks to be added to an analysis target in the separation data from the electropherogram, and identifying at least one of the analysis target peaks based on the analysis target peak information;
    a peak-of-interest identifying step of requiring the user to input peak-of-interest information on a peak of interest among the analysis target peaks from the electropherogram, and identifying the peak of interest based on the peak-of-interest information; and
    an abundance ratio calculating step of automatically determining an abundance ratio of the peak of interest among all of the analysis target peaks based on a total value of peak areas of the analysis target peaks and a peak area value of the peak of interest, wherein
    the analysis target peak information input in the analysis target peak identifying step by the user is an analysis target range including a peak to be added to the analysis target, and an analysis exclusion range including a peak to be excluded from the analysis target in the analysis target range, and
    in the analysis target peak identifying step, the peak in the analysis target range excluding the peak in the analysis exclusion range is identified as the analysis target peak.

8. The electrophoretic separation data analyzing method according to claim 7, wherein the abundance ratio calculating step is executed immediately after the analysis target peak and the peak of interest are identified.

9. The electrophoretic separation data analyzing method according to claim 7, further comprising an abundance ratio displaying step of displaying the abundance ratio of the peak of interest calculated in the abundance ratio calculating step on a display device.

10. The electrophoretic separation data analyzing method according to claim 7, wherein
    the peak-of-interest information input in the peak-of-interest identifying step by the user is a range of interest including a peak of interest, and
    in the peak-of-interest identifying step, the peak in the range of interest is identified as the peak of interest.

11. The electrophoretic separation data analyzing method according to claim 10, further comprising an electropherogram creating step of creating an electropherogram as the separation data, wherein
- in the analysis target peak identifying step, the user is required to specify the analysis target range and the analysis exclusion range on the electropherogram, and
- in the peak-of-interest identifying step, the user is required to specify the range of interest on the electropherogram.

12. The electrophoretic separation data analyzing method according to claim 10, further comprising a separation image creating step of creating a separation image of a peak on an electrophoresis flow channel as the separation data, wherein
- in the analysis target peak identifying step, the user is required to specify the analysis target range and the analysis exclusion range on the separation image, and
- in the peak-of-interest identifying step, the user is allowed to specify the range of interest on the separation image.

13. A computer program configured to execute the electrophoretic separation data analyzing method according to claim 7 by being executed on a computer.

\* \* \* \* \*